United States Patent
Li et al.

(10) Patent No.: US 11,838,084 B2
(45) Date of Patent: Dec. 5, 2023

(54) CODEBOOK CONSTRAINT AND CODEBOOK PARAMETER DETERMINATION METHOD AND APPARATUS

(71) Applicant: DATANG MOBILE COMMUNICATIONS EQUIPMENT CO.,LTD., Beijing (CN)

(72) Inventors: Hui Li, Beijing (CN); Qiubin Gao, Beijing (CN); Runhua Chen, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 200 days.

(21) Appl. No.: 17/421,723

(22) PCT Filed: Dec. 25, 2019

(86) PCT No.: PCT/CN2019/128463
§ 371 (c)(1),
(2) Date: Jul. 8, 2021

(87) PCT Pub. No.: WO2020/143456
PCT Pub. Date: Jul. 16, 2020

(65) Prior Publication Data
US 2022/0085858 A1 Mar. 17, 2022

(30) Foreign Application Priority Data
Jan. 8, 2019 (CN) .......................... 201910017133.2
Feb. 13, 2019 (CN) .......................... 201910112862.6

(51) Int. Cl.
*H04B 7/06* (2006.01)

(52) U.S. Cl.
CPC ......... *H04B 7/0639* (2013.01); *H04B 7/0617* (2013.01)

(58) Field of Classification Search
CPC .. H04B 7/0639; H04B 7/0617; H04B 7/0478; H04B 7/0456; H04B 7/0486; H04B 7/0408
(Continued)

(56) References Cited

U.S. PATENT DOCUMENTS

| 2016/0142117 | A1 | 5/2016 | Rahman et al. |
| 2020/0083939 | A1* | 3/2020 | Park ..................... H04L 5/0051 |
| 2020/0195319 | A1* | 6/2020 | Park ..................... H04B 7/0663 |

FOREIGN PATENT DOCUMENTS

| CN | 101425832 A | 5/2009 |
| CN | 102082637 A | 6/2011 |

(Continued)

OTHER PUBLICATIONS

Huawei et al.,"WF on CBSR for advanced CSI codebook", 3GPP TSG RAN WG1 Meeting #90bis, Prague, Czech Republic, Oct. 9-13, 2017, total 3 pages, R1-1718918.
(Continued)

*Primary Examiner* — Fitwi Y Hailegiorgis
(74) *Attorney, Agent, or Firm* — KILPATRICK TOWNSEND & STOCKTON, LLP

(57) ABSTRACT

Disclosed are a codebook constraint and codebook parameter determination method and apparatus, and same are used for preventing the generation of a beam with an orientation bringing about interference, and to prevent interference. The codebook constraint method includes determining codebook sub-set constraint indication information for indicating that one or more beam groups in a candidate combination beam set are constrained and coefficients in a first coefficient set corresponding to each beam of the beam groups are con-
(Continued)

strained, and sending the codebook sub-set constraint indication information to a terminal.

17 Claims, 4 Drawing Sheets

(58) Field of Classification Search
USPC .......................................................... 375/267
See application file for complete search history.

(56) References Cited

FOREIGN PATENT DOCUMENTS

| | | |
|---|---|---|
| CN | 103973409 A | 8/2014 |
| CN | 102082637 B | 3/2015 |
| CN | 105474555 A | 4/2016 |
| CN | 108093481 A | 5/2018 |
| CN | 111416641 A | 7/2020 |
| KR | 20180136406 A | 12/2018 |
| WO | 2016164073 A1 | 10/2016 |
| WO | 2018182381 A1 | 10/2018 |
| WO | 2018199626 A1 | 11/2018 |
| WO | 2019004756 A1 | 1/2019 |

OTHER PUBLICATIONS

Ericsson, "On Advanced CSI codebook subset restriction", 3GPP TSG RAN WG1 Meeting #92, Athens, Greece, Feb. 26-Mar. 2, 2018, total 8 pages, R1-1802733.

3GPP TS 38.214 V15.4.0, 3rd Generation Partnership Project;Technical Specification Group Radio Access Network;NR;Physical layer procedures for data (Release 15), total 102 pages. Dec. 2018.

* cited by examiner

CODEBOOK CONSTRAINT AND CODEBOOK PARAMETER DETERMINATION METHOD AND APPARATUS

The disclosure is a National Stage of International Application No. PCT/CN2019/128463, filed on Dec. 25, 2019, which claims priority to the Chinese Patent Application No. 201910017133.2, filed to the China National Intellectual Property Administration on Jan. 8, 2019, and claims priority to the Chinese Patent Application No. 201910112862.6, filed to the China National Intellectual Property Administration on Feb. 13, 2019, all of which are incorporated herein by reference.

FIELD

The disclosure relates to the field of communication technology, in particular to codebook restriction and codebook parameter determination methods and apparatuses.

BACKGROUND

In NR Rel-15, a Type II codebook is defined, which supports a rank 1 codebook and a rank 2 codebook on the basis of a manner of linear combination for beams in an orthogonal beam group. As for one sub-band, the rank 1 codebook is shown as:

$$w = \begin{bmatrix} \tilde{w}_{0,0} \\ \tilde{w}_{1,0} \end{bmatrix},$$

and the rank 2 codebook is shown as:

$$w = \begin{bmatrix} \tilde{w}_{0,0} & \tilde{w}_{0,1} \\ \tilde{w}_{1,0} & \tilde{w}_{1,1} \end{bmatrix},$$

and $$\tilde{w}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i},$$

L represents the number of orthogonal beams in the group, $b_{k_1,k_2}$ represents orthogonal beams, 2D (Two-Dimensional) Discrete Fourier Transform (DFT) is adopted, as for vectors, r=0, 1, represents a first polarization direction and a second polarization direction in a dual-polarization antenna array, and l=0, 1 represents a layer. $p_{r,l,i}^{(WB)}$ represents a wideband amplitude quantization factor which acts on a beam i in the beam group, a polarization directions r and the layer l; $p_{r,l,i}^{(SB)}$ represents a sub-band amplitude quantization factor which acts on the beam i in the beam group, the polarization directions r and the layer l; and $c_{r,l,i}$ represents a sub-band phase quantization factor which acts on the beam i in the beam group, the polarization directions r and the layer l.

Codebook sub-set restriction is to make a base station indicate a terminal that some codewords or some codebook parameters are prohibited, on the one hand, control of the base station over UE feedback is achieved, and on the other hand, the computation complexity of UE may be lowered. In Rel-15, the Type II codebook supports both restriction to rank RI and restriction to the beams, and the restriction to the beams is used for controlling the terminal to fail in feeding back codewords in some beam directions to avoid interference. As for the above codebook structure, beam sub-set restriction in Rel-15 is divided into two parts, that is, one part is restriction to a candidate beam set of synthetic beams $b_{k_1,k_2}$ and the other part is restriction to a value of a wideband amplitude $p_{r,l,i}^{(WB)}$ corresponding to a restricted beam.

To sum up, a Type II codebook with low-overhead is defined in NR Rel-16, which compresses a coefficient of each sub-band and feeds back compressed coefficients to the base station. For example, rank=1, and as for all sub-bands, the codebook may be shown as:

$$w = w_1 \tilde{w}_2 w_f^H =$$

$$\begin{bmatrix} b_{k_1^{(0)} k_2^{(0)}} & b_{k_1^{(1)} k_2^{(1)}} & \cdots & b_{k_1^{(L-1)} k_2^{(L-1)}} & 0 \\ 0 & & & & b_{k_1^{(0)} k_2^{(0)}} & b_{k_1^{(1)} k_2^{(1)}} & \cdots & b_{k_1^{(L-1)} k_2^{(L-1)}} \end{bmatrix} \cdot$$

$$\begin{bmatrix} p_{0,0} \cdot c_{0,0} & p_{0,1} \cdot c_{0,1} & \cdots & p_{0,M-1} \cdot c_{0,M-1} \\ p_{1,0} \cdot c_{1,0} & p_{1,1} \cdot c_{1,1} & \cdots & p_{1,M-1} \cdot c_{1,M-1} \\ \vdots & & & \vdots \\ p_{2L-1,0} \cdot c_{2L-1,0} & p_{2L-1,1} \cdot c_{2L-1,1} & \cdots & p_{2L-1,M-1} \cdot c_{2L-1,M-1} \end{bmatrix} \cdot$$

$$\begin{bmatrix} f_{0,0} & f_{0,1} & \cdots & f_{0,N-1} \\ f_{1,0} & f_{1,1} & \cdots & f_{1,N-1} \\ \vdots & & & \vdots \\ f_{M-1,0} & f_{M-1,1} & \cdots & f_{M-1,N-1} \end{bmatrix},$$

and orthogonal combining beams included in $W_1$ are the same as those of the Type II codebook of Rel-15; $\tilde{W}_2$ represents the compressed coefficients, $p_{i,j}$ represents an amplitude coefficient, $c_{i,j}$ represents a phase coefficient, and the coefficients need to be fed back to the base station; and $W_f$ represents a compression base vector, and M base vectors are included, a length of each vector is N, and N is determined according to the number of the sub-bands. As the codebook structure changes, a codebook sub-set restriction method used in Rel-15 may not be directly used for a codebook of Rel-16.

SUMMARY

Embodiments of the disclosure provide codebook restriction and codebook parameter determination methods and apparatuses to prevent the generation of a beam with an orientation bringing about interference, and preventing interference.

On a network side, e.g., a base station side, an embodiment of the disclosure provides a codebook restriction method, including:
- determining codebook sub-set restriction indication information for indicating that one or more beam groups in a candidate combining beam set are restricted and that coefficients in a first coefficient set corresponding to each of beams in the beam groups are restricted; and
- sending the codebook sub-set restriction indication information to a terminal.

Through the method, the codebook sub-set restriction indication information is determined for indicating that one or more beam groups in the candidate combining beam set are restricted and that the coefficients in the first coefficient set corresponding to each of beams in the beam groups are restricted, and the codebook sub-set restriction indication information is sent to the terminal, and preventing the generation of the beam with the orientation bringing about interference and then preventing interference.

In one embodiment, the one or more beam groups in the candidate combining beam set are formed through one of the following manners:
- manner 1, beams mutually orthogonal with each other in the candidate combining beam set are in one beam group; and
- manner 2, beams adjacent to each other in the candidate combining beam set are in one beam group.

In one embodiment, a coefficient in the first coefficient set corresponding to each of the beams in the one or more beam groups is used for generating a weight of the beam on each sub-band.

In one embodiment, the coefficients in the first coefficient set are restricted for limiting the following:
- limiting a value of each amplitude coefficient among all the coefficients in the first coefficient set, or a value of a pre-defining first function of part of or all of the amplitude coefficients; or
- limiting a value of each phase coefficient among all the coefficients in the first coefficient set, or a value of a pre-defining second function of part of or all of the phase coefficients; or
- limiting a value of each of amplitude coefficients and a value of each of phase coefficients among all the coefficients in the first coefficient set, or a value of a pre-defining third function of part of or all of the amplitude coefficients and the phase coefficients.

In one embodiment, the pre-defining first function is a sum of all the amplitude coefficients, or a maximum value in all the amplitude coefficients, or a maximum value of wideband amplitude coefficients, or a maximum value in all difference amplitude coefficients, or a maximum value of the wideband amplitude coefficients and a maximum value in all the difference amplitude coefficients, or a maximum value of products of the wideband amplitude coefficients and the difference amplitude coefficients, or a maximum value of the wideband amplitude coefficients and a sum of all the difference amplitude coefficients, or a sum of products of the wideband amplitude coefficients and each of the difference amplitude coefficients; and the pre-defining second function is a sum of all the phase coefficients, or a maximum value of all the phase coefficients, or a minimum value of phase differences in all the phase coefficients.

In one embodiment, the codebook sub-set restriction indication information is further used for indicating that one or more base vector groups in a candidate base vector set are restricted.

In one embodiment, the base vector groups are formed through one of the following manners:
- manner 1, base vectors mutually orthogonal with each other in the candidate base vector set are in one base vector group; and
- manner 2, base vectors adjacent to each other in the candidate base vector set are in one base vector group.

In one embodiment, the codebook sub-set restriction indication information is further used for indicating that coefficients in a second coefficient set corresponding to each of base vectors in the one or more restricted base vector groups are restricted.

In one embodiment, the coefficients in the second coefficient set corresponding to each of the base vectors are restricted for limiting the following:
- limiting a value of each amplitude coefficient among all coefficients in the second coefficient set corresponding to each of the base vectors, or a value of a pre-defining fourth function of part of or all of the amplitude coefficients; or
- limiting a value of each phase coefficient among all the coefficients in the second coefficient set corresponding to each of the base vectors, or a value of a pre-defining fifth function of part of or all of the phase coefficients; or
- limiting a value of each of amplitude coefficients and a value of each of phase coefficients among all the coefficients in the second coefficient set corresponding to each of the base vectors, or a value of a pre-defining sixth function of part of or all of the amplitude coefficients and the phase coefficients.

In one embodiment, the pre-defining fourth function is a sum of all the amplitude coefficients, or a maximum value in all the amplitude coefficients, or a maximum value of wideband amplitude coefficients, or a maximum value in all difference amplitude coefficients, or a maximum value of the wideband amplitude coefficients and a maximum value in all the difference amplitude coefficients, or a maximum value of products of the wideband amplitude coefficients and the difference amplitude coefficients, or a maximum value of the wideband amplitude coefficients and a sum of all the difference amplitude coefficients, or a sum of products of the wideband amplitude coefficients and each of the difference amplitude coefficients; and the pre-defining fifth function is a sum of all the phase coefficients, or a maximum value in all the phase coefficients, or a minimum value of phase differences in all the phase coefficients.

In one embodiment, the codebook sub-set restriction indication information is further used for indicating that all base vectors in the one or more restricted base vector groups is not used for codebook configuration and feedback.

In one embodiment, the codebook sub-set restriction indication information is further used for restricting a value of a number of the base vectors corresponding to one or more beams.

In one embodiment, the codebook sub-set restriction indication information is further used for restricting a value of a number of coefficients which are zero in all codebook coefficients.

Correspondingly, on a terminal side, an embodiment of the disclosure provides a codebook parameter determination method, including:
receiving codebook sub-set restriction indication information, and the codebook sub-set restriction indication information is used for indicating that one or more beam groups in a candidate combining beam set are restricted, and that coefficients in a first coefficient set corresponding to each of beams in the one or more beam groups are restricted; and
determining codebook parameters according to the codebook sub-set restriction indication information.

In one embodiment, the codebook sub-set restriction indication information is further used for indicating that one or more base vector groups in a candidate base vector set are restricted.

In one embodiment, the codebook sub-set restriction indication information is further used for indicating that coefficients in a second coefficient set corresponding to each of base vectors in the one or more restricted base vector groups are restricted.

In one embodiment, the codebook sub-set restriction indication information is further used for indicating that all base vectors in the one or more restricted base vector groups is not used for codebook configuration and feedback.

In one embodiment, the codebook sub-set restriction indication information is further used for restricting a value of a number of the base vectors corresponding to one or more beams.

In one embodiment, the codebook sub-set restriction indication information is further used for restricting a value of a number of coefficients which are zero in all codebook coefficients.

In one embodiment, the method further includes:
sending the codebook parameters to a base station.

On a network side, e.g., a base station side, an embodiment of the disclosure provides a codebook restriction apparatus, including:
a memory, configured to store program instructions; and
a processor, configured to call the program instructions stored in the memory to:
determine codebook sub-set restriction indication information for indicating that one or more beam groups in a candidate combining beam set are restricted and that coefficients in a first coefficient set corresponding to each of beams in the beam groups are restricted; and
send the codebook sub-set restriction indication information to a terminal.

In one embodiment, the one or more beam groups in the candidate combining beam set are formed through one of the following manners:
manner 1, beams mutually orthogonal with each other in the candidate combining beam set are in one beam group; and
manner 2, beams adjacent to each other in the candidate combining beam set are in one beam group.

In one embodiment, a coefficient in the first coefficient set corresponding to each of the beams in the one or more beam groups is used for generating a weight of the beam on each sub-band.

In one embodiment, the coefficients in the first coefficient set are restricted for limiting the following:
limiting a value of each amplitude coefficient among all coefficients in the first coefficient set, or a value of a pre-defining first function of part of or all of the amplitude coefficients; or
limiting a value of each phase coefficient among all the coefficients in the first coefficient set, or a value of a pre-defining second function of part of or all of the phase coefficients; or
limiting a value of each of amplitude coefficients and a value of each of phase coefficients among all the coefficients in the first coefficient set, or a value of a pre-defining third function of part of or all of the amplitude coefficients and the phase coefficients.

In one embodiment, the pre-defining first function is a sum of all the amplitude coefficients, or a maximum value in all the amplitude coefficients, or a maximum value of wideband amplitude coefficients, or a maximum value in all difference amplitude coefficients, or a maximum value of the wideband amplitude coefficients and a maximum value in all the difference amplitude coefficients, or a maximum value of products of the wideband amplitude coefficients and the difference amplitude coefficients, or a maximum value of the wideband amplitude coefficients and a sum of all the difference amplitude coefficients, or a sum of products of the wideband amplitude coefficients and each of the difference amplitude coefficients; and
the pre-defining second function is a sum of all the phase coefficients, or a maximum value in all the phase coefficients, or a minimum value of phase differences in all the phase coefficients.

In one embodiment, the codebook sub-set restriction indication information is further used for indicating that one or more base vector groups in a candidate base vector set are restricted.

In one embodiment, the base vector groups are formed through one of the following manners:
manner 1, base vectors mutually orthogonal with each other in the candidate base vector set are in one base vector group; and
manner 2, base vectors adjacent to each other in the candidate base vector set are in one base vector group.

In one embodiment, the codebook sub-set restriction indication information is further used for indicating that coefficients in a second coefficient set corresponding to each of the base vectors in one or more restricted base vector groups are restricted.

In one embodiment, the coefficients in the second coefficient set corresponding to each of the base vectors are restricted for limiting the following:
limiting a value of each of the amplitude coefficients in all the coefficients in the second coefficient set corresponding to each of the base vectors, or a value of a pre-defining fourth function of part of or all of the amplitude coefficients; or
limiting a value of each of the phase coefficients in all the coefficients in the second coefficient set corresponding to each of the base vectors, or a value of a pre-defining fifth function of part of or all of the phase coefficients; or
limiting a value of each of amplitude coefficients and a value of each of phase coefficients in all the coefficients in the second coefficient set corresponding to each of the base vectors, or a value of a pre-defining sixth function of part of or all of the amplitude coefficients and the phase coefficients.

In one embodiment, the pre-defining fourth function is a sum of all the amplitude coefficients, or a maximum value in all the amplitude coefficients, or a maximum value of wideband amplitude coefficients, or a maximum value in all difference amplitude coefficients, or a maximum value of the wideband amplitude coefficients and a maximum value in all the difference amplitude coefficients, or a maximum value of products of the wideband amplitude coefficients and the difference amplitude coefficients, or a maximum value of the wideband amplitude coefficients and a sum of all the difference amplitude coefficients, or a sum of products of the wideband amplitude coefficients and each of the difference amplitude coefficients; and the pre-defining fifth function is a sum of all the phase coefficients, or a maximum value in all the phase coefficients, or a minimum value of phase differences in all the phase coefficients.

In one embodiment, the codebook sub-set restriction indication information is further used for indicating that all base vectors in the one or more restricted base vector groups is not used for codebook configuration and feedback.

In one embodiment, the codebook sub-set restriction indication information is further used for restricting a value of a number of the base vectors corresponding to one or more beams.

In one embodiment, the codebook sub-set restriction indication information is further used for restricting a value of a number of coefficients which are zero in all codebook coefficients.

On a terminal side, an embodiment of the disclosure provides a codebook parameter determination apparatus, including:
 a memory, configured to store program instructions; and
 a processor, configured to call the program instructions stored in the memory, and according to obtained programs, perform:
  receive codebook sub-set restriction indication information, and the codebook sub-set restriction indication information is used for indicating that one or more beam groups in a candidate combining beam set are restricted, and that coefficients in a first coefficient set corresponding to each of beams in the one or more beam groups are restricted; and
  determine codebook parameters according to the codebook sub-set restriction indication information.

In one embodiment, the codebook sub-set restriction indication information is further used for indicating that one or more base vector groups in a candidate base vector set are restricted.

In one embodiment, the codebook sub-set restriction indication information is further used for indicating that coefficients in a second coefficient set corresponding to each of base vectors in the one or more restricted base vector groups are restricted.

In one embodiment, the codebook sub-set restriction indication information is further used for indicating that all base vectors in the one or more restricted base vector groups is not used for codebook configuration and feedback.

In one embodiment, the codebook sub-set restriction indication information is further used for restricting a value of a number of the base vectors corresponding to one or more beams.

In one embodiment, the codebook sub-set restriction indication information is further used for restricting a value of a number of coefficients which are zero in all codebook coefficients.

In one embodiment, the processor is further used for calling the program instructions stored in the memory to:
 sending the codebook parameters to a base station.

On a network side, an embodiment of the disclosure provides another codebook restriction apparatus, including:
 a determination device, configured to determine the codebook sub-set restriction indication information used for indicating that one or more beam groups in a candidate combining beam set are restricted, and that coefficients in a first coefficient set corresponding to each of beams in the one or more beam groups are restricted; and
 a sending device, configured to send the codebook sub-set restriction indication information to a terminal.

On a terminal side, an embodiment of the disclosure provides another codebook parameter determination apparatus, including:
 a receiving device, configured to receive codebook sub-set restriction indication information, and the codebook sub-set restriction indication information is used for indicating that one or more beam groups in a candidate combining beam set are restricted, and that coefficients in a first coefficient set corresponding to each of beams in the one or more beam groups are restricted; and
 a determination device, configured to determine codebook parameters according to the codebook sub-set restriction indication information.

Another embodiment of the disclosure provides a computer storage medium storing a computer executable instruction used for make a computer execute any one of the methods described above.

BRIEF DESCRIPTION OF THE DRAWINGS

In order to more clearly describe embodiments of the disclosure, accompanying drawings needed in description of the embodiments will be briefly introduced below. The drawings described below only serve as some embodiments of the disclosure.

DETAILED DESCRIPTION OF THE EMBODIMENTS

Figure 1:
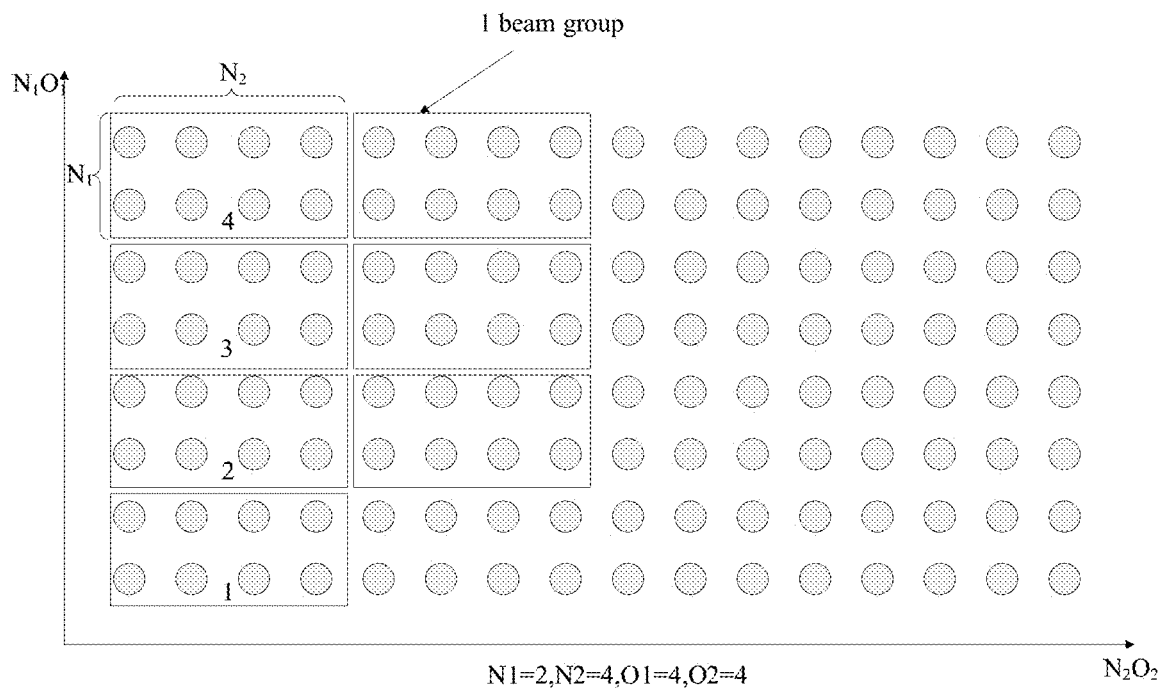
FIG. 1 is a schematic diagram of beam groups of a candidate beam set provided by an embodiment of the disclosure.

It should be understood that embodiments of the present disclosure may be applied to various communication systems, e.g., a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a Universal Mobile Telecommunication System (UMTS), and a New Radio (NR), etc.

It also should be understood that in the embodiments of the present disclosure, User Equipment (UE) includes but is not limited to a Mobile Station (MS), a Mobile Terminal, a Mobile Telephone, a handset, portable equipment, etc. The user equipment may communicate with one or more core networks through a Radio Access Network (RAN), for example, the user equipment may be the mobile telephone (or called a "cell" phone), a computer with a wireless communication function, etc. or may be a portable or pocket or hand-held or computer built-in or vehicle-mounted mobile apparatus.

In the embodiments of the present disclosure, a base station (e.g., an access point) may refer to equipment which communicates with a wireless terminal on an air interface in an access network through one or more sectors. The base station may be used for interconverting a received air frame and an IP group, serving as a router between the wireless terminal and the rest part of the access network, and the rest part of the access network may include an internet protocol (IP) network. The base station may coordinate attribute management of the air interface. For example, the base station may be a Base Transceiver Station (BTS) in GSM or CDMA, or a NodeB in TD-SCDMA or WCDMA, or an evolutional Node B (eNodeB or an eNB or an e-NodeB) in LTE, or a gNB in 5G NR, which is not limited here.

A Type II codebook is defined in an NR system. A Type II codebook in Rel-15 is based on linear combination for orthogonal beams and is high in channel quantization precision but high in feedback overhead. A Type II codebook with low-overhead is provided in Rel-16, which is based on a method of linear combination for the orthogonal beams and sub-band coefficient compression. According to a Type II codebook structure with low-overhead of Rel-16, the embodiments of the disclosure provide codebook sub-set restriction and codebook parameter determination methods and apparatuses, which may control directions of the linearly combined beams and then prevent interference.

The methods and the apparatuses are based on the same application concept, and as the principle of solving problems of the methods is similar to that of solving problems of the apparatuses, implementations of the apparatuses and the methods may be referred to each other, and repetition is omitted.

The embodiments of the disclosure may be applied to various systems, especially, the 5G system, e.g., the Global System of Mobile communication (GSM), the Code Division Multiple Access (CDMA) system, the Wideband Code Division Multiple Access (WCDMA) system, the General Packet Radio Service (GPRS) system, the Long Term Evolution (LTE) system, an LTE frequency division duplex (FDD) system, an LTE time division duplex (TDD), the universal mobile telecommunication system (UMTS), a worldwide interoperability for microwave access (WiMAX) system, the 5G system, the 5G NR system, etc. The various systems include terminal devices and network devices.

The terminal devices mentioned in the embodiments of the disclosure may refer to devices providing voice and/or data connectivity for a user, hand-held devices with a wireless connection function, or other processing devices connected to a wireless modem. In the different systems, names of the terminal devices may differ, for example, in the 5G system, the terminal devices may be called user equipment (UE). Wireless terminal devices may communicate with one or more core networks through RAN and may be mobile terminal devices, e.g., the mobile phone (or called the "cell" phone) and a computer with the mobile terminal devices, for example, a portable or pocket or hand-held or computer built-in or vehicle-mounted mobile apparatus, which exchange languages and/or data with a wireless access network, and for example, a personal communication service (PCS) telephone, a cordless telephone, a session initiated protocol (SIP) phone, a wireless local loop (WLL) station, a personal digital assistant (PDA), etc. The wireless terminal devices may be also called a system, a subscriber device, a subscriber station, a mobile station, a mobile, a remote station, an access point, a remote terminal, an access terminal, a user terminal, a user agent and a user device, which is not defined in the embodiments of the disclosure.

The network devices mentioned in the embodiments of the disclosure may be a base station, and the base station may include cells. According to different specific application occasions, the base station may be also called the access point, or devices which communicates with the wireless terminal devices on the air interface in the access network through one or more sectors, or have other names. The network devices may be used for interconverting the received air frame and the internet protocol (IP) group, serving as the router between the wireless terminal devices and the rest part of the access network, and the rest part of the access network may include an internet protocol (IP) communication network. The network devices may coordinate attribute management of the air interface. For example, the network devices mentioned in the embodiments of the disclosure may be a base transceiver station (BTS) in the global system for mobile communications (GSM) or the code division multiple access (CDMA), or the NodeB in the wide-band code division multiple access (WCDMA), or the evolutional node B (eNB or e-NodeB) in the long term evolution (LTE) system, a 5G base station in a next generation system, or a home evolved node B (HeNB), a relay node, a femto, a pico, etc., which is not defined in the embodiments of the disclosure.

All the embodiments of the disclosure will be described in detail below in combination with the accompanying drawings of the description. It should be noted that the showing sequence of the embodiments of the disclosure only represent the sequential order of the embodiments.

An embodiment of the disclosure provides a new codebook sub-set restriction method to achieve beam restriction to a codebook. The restriction method includes one or combination of more of the following restriction manners:

combining beams are restricted;
coefficients corresponding to the restricted combining beams are restricted;
base vectors for compression are restricted; and
coefficients corresponding to the restricted base vectors are restricted.

Through the codebook sub-set restriction method, beams with some directions may be avoided, and preventing interference.

Specifically, for example, on a base station side, a codebook sub-set restriction method includes: a base station indicates that one or more beam groups in a candidate combining beam set are restricted and that coefficients (first coefficients) in a coefficient set (a first coefficient set) corresponding to each beam in the one or more beam groups are restricted.

In one embodiment, the beam groups of the candidate combining beam set may be that beams mutually orthogonal with each other in the set are in one group, or beams adjacent to each other are in one group.

In one embodiment, a coefficient in the first coefficient set corresponding to the beam is used for generating a weight of the beam on each sub-band.

In one embodiment, the first coefficients are restricted to limit a value of each amplitude coefficient in all coefficients in the set, or a value of a pre-defining first function of part of or all of the amplitude coefficients; or limit a value of each phase coefficient in all the coefficients in the set, or a value of a pre-defining second function of part of or all of the phase coefficients; or limit a value of each of amplitude coefficients and a value of each of phase coefficients in all the coefficients, or a value of a pre-defining third function of part of or all of the amplitude coefficients and the phase coefficients.

In one embodiment, the pre-defining first function may be a sum of all the amplitude coefficients, or a maximum value in all the amplitude coefficients, or a maximum value of wideband amplitude coefficients, or a maximum value in all difference amplitude coefficients, or a maximum value of the wideband amplitude coefficients and a maximum value in all the difference amplitude coefficients, or a maximum value of products of the wideband amplitude coefficients and the difference amplitude coefficients, or a maximum value of the wideband amplitude coefficients and a sum of all the difference amplitude coefficients, or a sum of products of the wideband amplitude coefficients and each of the difference amplitude coefficients. The pre-defining second function may be a sum of all the phase coefficients, or a maximum value in all the phase coefficients, or a minimum value of phase differences in all the phase coefficients.

In one embodiment, the base station may further indicate that one or more base vector groups in a candidate base vector set are restricted. Namely, the codebook sub-set restriction indication information is further used for indicating that one or more base vector groups in the candidate base vector set are restricted.

In one embodiment, the base vector groups may be that base vectors mutually orthogonal with each other in the candidate base vector set are in one group, or base vectors adjacent to each other are in one group.

In one embodiment, the codebook sub-set restriction indication information is further used for indicating that coefficients (second coefficients) in a coefficient set (a second coefficient set) corresponding to each of base vectors in the one or more restricted base vector groups are restricted.

In one embodiment, the second coefficients are restricted to limit a value of each of amplitude coefficients in all coefficients in the second coefficient set, or a value of a pre-defining fourth function of part of or all of the amplitude coefficients; or limit a value of each of phase coefficients in all the coefficients in the second coefficient set, or a value of a pre-defining fifth function of part of or all of the phase coefficients; or limit a value of each of amplitude coefficients and a value of each of phase coefficients in all the coefficients in the second coefficient set, or a value of a pre-defining sixth function of part of or all of the amplitude coefficients and the phase coefficients.

In one embodiment, the pre-defining fourth function may be a sum of all the amplitude coefficients, or a maximum value in all the amplitude coefficients, or a maximum value of wideband amplitude coefficients, or a maximum value in all difference amplitude coefficients, or a maximum value of the wideband amplitude coefficients and a maximum value in all the difference amplitude coefficients, or a maximum value of products of the wideband amplitude coefficients and the difference amplitude coefficients, or a maximum value of the wideband amplitude coefficients and a sum of all the difference amplitude coefficients, or a sum of products of the wideband amplitude coefficients and each of the difference amplitude coefficients. The pre-defining fifth function may be a sum of all the phase coefficients, or a maximum value in all the phase coefficients, or a minimum value of phase differences in all the phase coefficients.

In one embodiment, the codebook sub-set restriction indication information is further used for indicating that all base vectors in the one or more restricted base vector groups may not be used for codebook configuration and feedback.

In one embodiment, the base station may further restrict a value of a number of base vectors corresponding to one or more beams. Namely, the codebook sub-set restriction indication information is further used for restricting the value of a number of the base vectors corresponding to the one or more beams.

In one embodiment, the base station may further restrict a value of a number of coefficients which are zero in feedback coefficients. Namely, the codebook sub-set restriction indication information is further used for restricting a value of a number of coefficients which are zero in all codebook coefficients.

Correspondingly, on a terminal side: the codebook sub-set restriction indication information of the base station is received, and codebook parameters are calculated in a parameter range indicated by the codebook sub-set restriction information.

In one embodiment, the calculated codebook parameters are fed back to the base station.

Several embodiments are given below for illustration.

In one embodiment, an antenna port number is N1 and N2, and N1 represents an antenna port number of a first dimension and N2 represents an antenna port number of a second dimension. Oversampling factors of beams in a codebook are O1 and O2. In this case, a candidate combining beam set includes N1O1N2O2 beams, each of the beams is represented as $b_{k_1^{(i)} k_2^{(i)}}$, $k_1=0,1, \ldots, N_1O_1-1$, $k_2=0, 1, \ldots, N_2O_2-1$. The system appoints that the N1N2 beams adjacent to each other are in one group, and O1O2 groups exist totally, as shown in FIG. 1.

Figure 2:
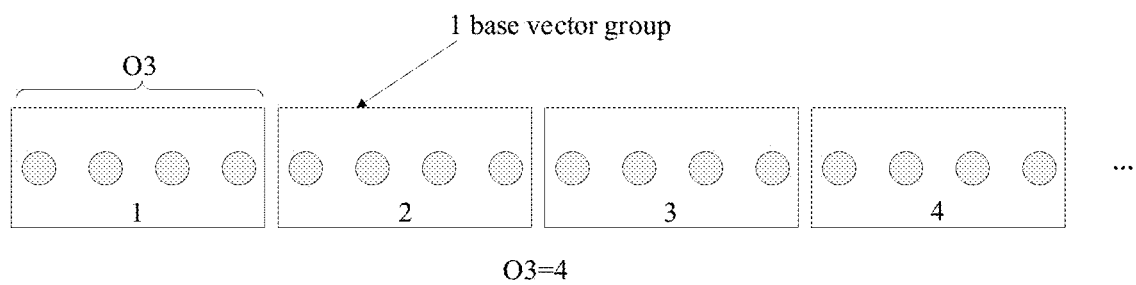
FIG. 2 is a schematic diagram of beam groups of a candidate base vector set provided by an embodiment of the disclosure.

In one embodiment, a length of a candidate base vector is N, the number of vectors in a candidate base vector set is N*O3, and O3 represents an oversampling factor. Each candidate base vector may be represented as $[f_{i,0}\ f_{i,1}\ \ldots\ f_{i,N-1}]^H$, $i=0, 1, \ldots, N \cdot O_3-1$. The system pre-defines that O3 beams adjacent to each other in a set of N*O3 candidate beam vectors are in one group, and N groups exits totally, as shown in FIG. 2.

When Rank=1, a structure of a Type II codebook is shown as:

$$w = w_1 \tilde{w}_2 w_f^H =$$

$$\begin{bmatrix} b_{k_1^{(0)}k_2^{(0)}} & b_{k_1^{(1)}k_2^{(1)}} & \cdots & b_{k_1^{(L-1)}k_2^{(L-1)}} & & & & 0 \\ & & 0 & & b_{k_1^{(0)}k_2^{(0)}} & b_{k_1^{(1)}k_2^{(1)}} & \cdots & b_{k_1^{(L-1)}k_2^{(L-1)}} \end{bmatrix}.$$

$$\begin{bmatrix} p_{0,0} \cdot c_{0,0} & p_{0,1} \cdot c_{0,1} & \cdots & p_{0,M-1} \cdot c_{0,M-1} \\ p_{1,0} \cdot c_{1,0} & p_{1,1} \cdot c_{1,1} & \cdots & p_{1,M-1} \cdot c_{1,M-1} \\ \vdots & & & \vdots \\ p_{2L-1,0} \cdot c_{2L-1,0} & p_{2L-1,1} \cdot c_{2L-1,1} & \cdots & p_{2L-1,M-1} \cdot c_{2L-1,M-1} \end{bmatrix}.$$

$$\begin{bmatrix} f_{0,0} & f_{0,1} & \cdots & f_{0,N-1} \\ f_{1,0} & f_{1,1} & \cdots & f_{1,N-1} \\ \vdots & & & \vdots \\ f_{M-1,0} & f_{M-1,1} & \cdots & f_{M-1,N-1} \end{bmatrix}.$$

Herein, 2L numbers of beams in $W_1$ include L different beams. Among the L different beams, a coefficient set corresponding to each of the beams is composed of two rows in $\tilde{W}_2$. For example, a coefficient set corresponding to a first beam $b_{k_1^{(0)}k_2^{(0)}}$ includes an amplitude coefficient set $\{p_{0,0}\ p_{0,1}\ \cdots\ p_{0,M-1},\ p_{L,0}\ p_{L,1}\ \cdots\ p_{L,M-1}\}$ and a phase coefficient set $\{c_{0,0}\ c_{0,1}\ \cdots\ c_{0,M-1},\ c_{L,0}\ c_{L,1}\ \cdots\ c_{L,M-1}\}$. A coefficient set corresponding to a second beam $b_{k_1^{(1)}k_2^{(1)}}$ includes an amplitude coefficient set $\{p_{1,0}\ p_{1,1}\ \cdots\ p_{1,M-1},\ p_{L+1,0}\ p_{L+1,1}\ \cdots\ p_{L+1,M-1}\}$ and a phase coefficient set $\{c_{1,0}\ c_{1,1}\ \cdots\ c_{1,M-1},\ c_{L+1,0}\ c_{L+1,1}\ \cdots\ c_{L+1,M-1}\}$, and so on.

It should be noted that if 2L numbers of beams in $W_1$ differ with one another, a coefficient set corresponding to each of the beams is composed of one row in $\tilde{W}_2$. In M base vectors in $W_f$, a coefficient set corresponding to each of the base vectors is composed of one column in $\tilde{W}_2$. For example, a coefficient set corresponding to a first base vector $[f_{0,0}\ f_{0,1}\ \cdots\ f_{0,N-1}]^H$ includes an amplitude coefficient set $\{p_{0,0}\ p_{1,0}\ \cdots\ p_{2L-1,0}\}$ and a phase coefficient set $\{c_{0,0}\ c_{1,0}\ \cdots\ c_{2L-1,0}\}$. A coefficient set corresponding to a second base vector $[f_{1,0}\ f_{1,1}\ \cdots\ f_{1,N-1}]^H$ includes an amplitude coefficient set $\{p_{0,1}\ p_{1,1}\ \cdots\ p_{2L-1,1}\}$ and a phase coefficient set $\{c_{0,1}\ c_{1,1}\ \cdots\ c_{2L-1,1}\}$ and so on.

The system appoints that a coefficient in the coefficient set corresponding to each of the beams is restricted to limit a value of a maximum amplitude coefficient in the set. Meanwhile the system appoints that a coefficient in the coefficient set corresponding to each of the base vectors is restricted to limit a value of a maximum amplitude coefficient in the set.

The base station indicates through high-level signaling that 2 beam groups (e.g., beam groups 1 and 2 in FIG. 1) in the candidate beam set are restricted, and indicates that 2 base vector groups (e.g., base vector groups 2 and 3 in FIG. 2) in the candidate base vector set are restricted, and meanwhile indicates that a maximum amplitude value in the amplitude coefficient set of the coefficient set corresponding to each beam of the 8 beams in beam group 1 and the 8 beams in beam group 2 is restricted to be $P_{max}$, which may be selected from amplitude coefficient quantization values of the Type II codebook. For example, high-level signaling indicates that amplitudes of the 16 beams are restricted to be $\{P_{max1}\ P_{max2}\ \cdots\ P_{max16}\}$. When the terminal determines according to a channel estimation result that a second beam in the L beams in $W_1$ is a third beam in the 16 restricted beams, coefficients in $\tilde{W}_2$ are restricted to meet a relation:

$$\max_{j=0,1,\ldots M-1} p_{1,j} \leq P_{max3}, \text{ and } \max_{j=0,1,\ldots M-1} p_{L+1,j} \leq P_{max3}.$$

Besides, it is indicated that a maximum amplitude value in the amplitude coefficient set of the coefficient set corresponding to each base vector of 4 base vectors in base vector group 2 and 4 base vectors in base vector group 3 is restricted to be $Q_{max}$, which may be selected from the amplitude coefficient quantization values of the Type II codebook. For example, high-level signaling indicates that amplitudes of the 8 base vectors are restricted to be $\{Q_{max1}\ Q_{max2}\ \cdots\ Q_{max8}\}$. When the terminal determines according to the channel estimation result that a third base vector in $W_f$ is a second base vector of the 8 restricted base vectors, coefficients in $\tilde{W}_2$ are restricted to meet a relation:

$$\max_{i=0,1,\ldots 2L-1} p_{i,2} \leq Q_{max2}.$$

The terminal calculates feedback coefficients of the Type II codebook according to the above restriction conditions and reports the feedback coefficients to the base station.

Embodiment 2

The system appoints that a coefficient in a coefficient set corresponding to each beam are restricted to limit a value of a sum of all amplitude coefficients in the set; and meanwhile the system appoints that each restricted base vector may not be used in a codebook.

The base station indicates through high-level signaling that 2 beam groups (e.g., beam groups 1 and 2 in FIG. 1) in a candidate beam set are restricted, high-level signaling indicates that amplitudes of 8 beams in beam group 1 and 8 beams in beam group 2 are restricted to be $\{P_{max1}\ P_{max2}\ \cdots\ P_{max16}\}$, which may be selected from amplitude coefficient quantization values of the Type II codebook. When a terminal determines according to a channel estimation result that a second beam in L beams in $W_1$ is a third beam in the 16 restricted beams, coefficients in $\tilde{W}_2$ are restricted to meet a relation:

$$\sum_{j=0,1,\ldots M-1} p_{1,j} \leq M \cdot P_{max3}, \text{ and}$$

$$\sum_{j=0,1,\ldots M-1} p_{L+1,j} \leq M \cdot P_{max3}.$$

Meanwhile, the high-level signaling indicates that 2 base vector groups (e.g., base vector groups 2 and 3 in FIG. 2) in the candidate base vector set are restricted, and these 8 base vectors may not be used by the terminal.

The terminal calculates feedback coefficients of the Type II codebook according to the above restriction conditions and reports the feedback coefficients to the base station.

Embodiment 3

When the base vectors corresponding to each beam in $W_1$ may differ, M values of each row in $\tilde{W}_2$ may differ, and in one embodiment, a value of an $i^{th}$ row is represented as Mi.

In this case, besides the above restriction indications, a candidate base vector set of each beam or a value of the number of base vectors corresponding to each beam may further be indicated through high-level signaling. For example, candidate base vectors which may be selected by each beam are indicated through a bitmap of $2L \times NO_3$, as shown in the following table. Or a candidate base vector group which may be selected by each beam is indicated through a position of $2L \times N$.

| Beam index in $W_1$ | Base vector 0 | Base vector 1 | Base vector 2 | ... | Base vector $NO_3-1$ |
|---|---|---|---|---|---|
| 0 | 1 | 1 | 0 | ... | 0 |
| 1 | 1 | 0 | 1 | ... | 1 |
| ... | | | | | |
| 2L-1 | 0 | 0 | 1 | ... | 1 |

As show in the table, the base vector may be used when a bit value is 1, otherwise, the base vector may not be used.

Besides, a value of the number of the base vectors corresponding to each beam may be further restricted, namely, a value of Mi in each row in $\tilde{W}_2$ is restricted.

Embodiment 4

In one embodiment, an antenna port number is N1 and N2, and N1 represents an antenna port number of a first dimension and N2 represents an antenna port number of a second dimension. Oversampling factors of beams in a codebook are O1 and O2. In this case, a candidate combining beam set includes N1O1N2O2 beams, each of the beams is represented as $b_{k_1^{(i)} k_2^{(i)}}$, $k_1 = 0, 1, \ldots, N_1 O_1 - 1$, $k_2 = 0, 1, \ldots, N_2 O_2 - 1$. The system appoints that the N1N2 beams adjacent to each other are in one group, and O1O2 groups exist totally, as shown in FIG. 1.

In one embodiment, a length of a candidate base vector is N, the number of vectors in a candidate base vector set is $N*O3$, and O3 represents an oversampling factor. Each candidate base vector may be represented as $[f_{i,0} \; f_{i,1} \; \ldots \; f_{i,N-1}]^H$, $i = 0, 1, \ldots, N \cdot O_3 - 1$. The system pre-defines that O3 beams adjacent to each other in a set of $N*O3$ candidate beam vectors are in one group, and N groups exits totally, as shown in FIG. 2.

When Rank=1, a structure of a Type II codebook is shown as:

$$w = w_1 \tilde{w}_2 w_f^H =$$

$$\begin{bmatrix} b_{k_1^{(0)} k_2^{(0)}} & b_{k_1^{(1)} k_2^{(1)}} & \cdots & b_{k_1^{(L-1)} k_2^{(L-1)}} & 0 \\ 0 & & & & b_{k_1^{(0)} k_2^{(0)}} & b_{k_1^{(1)} k_2^{(1)}} & \cdots & b_{k_1^{(L-1)} k_2^{(L-1)}} \end{bmatrix} \cdot$$

$$\begin{bmatrix} p_0^{(1)} & 0 & \cdots & 0 \\ 0 & p_1^{(1)} & \ddots & \vdots \\ \vdots & \ddots & \ddots & 0 \\ 0 & \cdots & 0 & p_{2L-1}^{(1)} \end{bmatrix} \cdot \begin{bmatrix} p_{0,0}^{(2)} \cdot c_{0,0} & p_{0,1}^{(2)} \cdot c_{0,1} & \cdots & p_{0,M-1}^{(2)} \cdot c_{0,M-1} \\ p_{1,0}^{(2)} \cdot c_{1,0} & p_{1,1}^{(2)} \cdot c_{1,1} & \cdots & p_{1,M-1}^{(2)} \cdot c_{1,M-1} \\ \vdots & & & \vdots \\ p_{2L-1,0}^{(2)} \cdot c_{2L-1,0} & p_{2L-1,1}^{(2)} \cdot c_{2L-1,1} & \cdots & p_{2L-1,M-1}^{(2)} \cdot c_{2L-1,M-1} \end{bmatrix} \cdot$$

$$\begin{bmatrix} f_{0,0} & f_{0,1} & \cdots & f_{0,N-1} \\ f_{1,0} & f_{1,1} & \cdots & f_{1,N-1} \\ \vdots & & & \vdots \\ f_{M-1,0} & f_{M-1,1} & \cdots & f_{M-1,N-1} \end{bmatrix}$$

Herein, $p_i^{(1)}$ represents a wideband amplitude coefficient, and $p_{i,j}^{(2)}$ represents a difference amplitude coefficient. 2L beams in $W_1$ include L different beams. Among the different L beams, a coefficient set corresponding to each beam is composed of two rows in $\tilde{W}_2$. For example, a coefficient set corresponding to a first beam $b_{k_1^{(0)} k_2^{(0)}}$ includes a wideband amplitude coefficient set $\{p_0^{(1)}, p_L^{(1)}\}$ and a difference amplitude coefficient set $\{p_{0,0}^{(2)} \; p_{0,1}^{(2)} \ldots p_{0,M-1}^{(2)}, p_{L,0}^{(2)} \; p_{L,1}^{(2)} \ldots p_{L,M-1}^{(2)}\}$, and a phase coefficient set $\{c_{0,0} \; c_{0,1} \ldots c_{0,M-1}, c_{L,0} \; c_{L,1} \ldots c_{L,M-1}\}$. A coefficient set corresponding to a second beam $b_{k_1^{(i)} k_2^{(i)}}$ includes a wideband amplitude coefficient set $\{p_1^{(1)}, p_{L+1}^{(1)}\}$, and a difference amplitude coefficient set $\{p_{1,0}^{(2)} \; p_{1,1}^{(2)} \ldots p_{1,M-1}^{(2)}, p_{L+1,0}^{(2)} \; p_{L+1,1}^{(2)} \ldots p_{L+1,M-1}^{(2)}\}$, and a phase coefficient set $\{c_{1,0} \; c_{1,1} \ldots c_{1,M-1}, c_{L+1,0} \; c_{L+1,1} \ldots c_{L+1,M-1}\}$, and so on.

It should be noted that if 2L beams in $W_1$ differ with one another, a coefficient set corresponding to each of the beams is composed of one row in $\tilde{W}_2$. In M base vectors in $W_f$, a coefficient set corresponding to each of the base vectors is composed of one column in $\tilde{W}_2$. For example, a coefficient set corresponding to a first base vector $[f_{0,0}\ f_{0,1}\ \ldots\ f_{1,N-1}]^H$ includes a difference amplitude coefficient set $\{p_{0,0}^{(2)}\ p_{1,0}^{(2)}\ \ldots\ p_{2L-1,0}^{(2)}\}$, a wideband amplitude coefficient set $\{p_0^{(1)}\ p_1^{(1)}\ \ldots\ p_{2L-1}^{(1)}\}$ and a phase coefficient set $\{c_{0,0}\ c_{1,0}\ \ldots\ c_{2L-1,0}\}$. A coefficient set corresponding to a second base vector $[f_{1,0}\ f_{1,1}\ \ldots\ f_{1,N-1}]^H$ includes a difference amplitude coefficient set $\{p_{0,1}^{(2)}\ p_{1,1}^{(2)}\ \ldots\ p_{2L-1,1}^{(2)}\}$, a wideband amplitude coefficient set $\{p_0^{(1)}\ p_1^{(1)}\ \ldots\ p_{2L-1}^{(1)}\}$, and a phase coefficient set $\{c_{0,1}\ c_{1,1}\ \ldots\ c_{2L-1,1}\}$, and so on.

The system appoints that a coefficient in the coefficient set corresponding to each beam is restricted to limit a value of a wideband amplitude coefficient in the set and a value of a maximum difference amplitude coefficient; and meanwhile the system appoints that a coefficient in the coefficient set corresponding to each base vector is restricted to limit a value of a maximum difference amplitude coefficient in the set.

The base station indicates through high-level signaling that 2 beam groups (e.g., beam groups 1 and 2 in FIG. 1) in the candidate beam set are restricted, and that 2 base vector groups (e.g., base vector groups 2 and 3 in FIG. 2) in the candidate base vector set are restricted, and meanwhile indicates that a wideband amplitude value in the amplitude coefficient set of the coefficient set corresponding to each beam of the 8 beams in beam group 1 and the 8 beams in beam group 2 is restricted to be $P_{max}^{(WB)}$, which may be selected from wideband amplitude coefficient quantization values of the Type II codebook. For example, high-level signaling indicates that wideband amplitudes of the 16 beams are restricted to be $\{P_{max1}^{(WB)}\ P_{max2}^{(WB)}\ \ldots\ P_{max16}^{(WB)}\}$. Besides, it is indicated that a maximum difference amplitude value in the amplitude coefficient set of the coefficient set corresponding to each beam of the 8 beams in beam group 1 and the 8 beams in beam group 2 is restricted to be $P_{max}$, which may be selected from difference amplitude coefficient quantization values of the Type II codebook. For example, high-level signaling indicates that difference amplitudes of the 16 beams are restricted to be $\{P_{max1}\ P_{max2}\ \ldots\ P_{max16}\}$. The terminal determines according to a channel estimation result that when a second beam in the L beams in $W_1$ is a third beam in the 16 restricted beams, coefficients in $\tilde{W}_2$ are restricted to meet a relation:

$$\max_{j=0,1,\ldots M-1} p_{1,j}^{(2)} \le P_{max3},\ \text{and}\ \max_{j=0,1,\ldots M-1} p_{L+1,j}^{(2)} \le P_{max3},\ p_1^{(1)} \le P_{max3}^{(WB)},$$
$$p_{L+1}^{(1)} \le P_{max3}^{(WB)}.$$

Besides, it is indicated that a maximum difference amplitude value in the amplitude coefficient set of the coefficient set corresponding to each base vector of 4 base vectors in base vector group 2 and 4 base vectors in base vector group 3 is restricted to be $Q_{max}$, which may be selected from difference amplitude coefficient quantization values of the Type II codebook. For example, high-level signaling indicates that amplitudes of the 8 base vectors are restricted to be $\{Q_{max1}\ Q_{max2}\ \ldots\ Q_{max8}\}$. A terminal determines according to the channel estimation result that when a third base vector in a $W_f$ is a second base vector in the 8 restricted base vectors, coefficients in $\tilde{W}_2$ are restricted to meet a relation:

$$\max_{i=0,1,\ldots 2L-1} p_{i,2}^{(2)} \le Q_{max2}.$$

Or, it is indicated that a maximum of products of width amplitude values and difference amplitude values in an amplitude coefficient set of the coefficient set corresponding to each base vector of 4 base vectors in base vector group 2 and 4 base vectors in base vector group 3 is restricted to be $O_{max}$, which may be selected from wideband amplitude coefficient quantization vales of the Type II codebook. For example, high-level signaling indicates that amplitudes of the 8 base vectors are restricted to be $\{O_{max1}\ O_{max2}\ \ldots\ O_{max8}\}$. The terminal determines according to the channel estimation result that when a third base vector in $W_f$ is a second base vector in the 8 restricted base vectors, coefficients in $\tilde{W}_2$ are restricted to meet a relation:

$$\max_{i=0,1,\ldots 2L-1} p_i^{(1)} \cdot p_{i,2}^{(2)} \le O_{max2}.$$

The terminal calculates feedback coefficients of the Type II codebook according to the above restriction conditions and reports the feedback coefficients to the base station.

Embodiment 5

In one embodiment, an antenna port number is N1 and N2, and N1 represents an antenna port number of a first dimension and N2 represents an antenna port number of a second dimension. Oversampling factors of beams in a codebook are O1 and O2. In this case, a candidate combining beam set includes N1O1N2O2 beams, and each of the beams is represented as $b_{k_1^{(i)}k_2^{(i)}}$, $k_1=0, 1, \ldots, N_1O_1-1$, $k_2=0, 1, \ldots, N_2O_2-1$. The system appoints that the N1N2 beams adjacent to each other are in one group, and O1O2 groups exist totally, as shown in FIG. 1.

In one embodiment, a length of a candidate base vector is N, the number of vectors in a candidate base vector set is N*O3, and O3 represents an oversampling factor. Each candidate base vector may be represented as $[f_{i,0}\ f_{i,1}\ \ldots\ f_{i,N-1}]^H$, $i=0, 1, \ldots, N\cdot O_3-1$. The system pre-defines that O3 beams adjacent to each other in a set of N*O3 candidate beam vectors are in one group, and N groups exits totally, as shown in FIG. 2.

When Rank=1, a structure of a Type II codebook is shown as:

$$w = w_1 \tilde{w}_2 w_f^H =$$

$$\begin{bmatrix} b_{k_1^{(0)}k_2^{(0)}} & b_{k_1^{(1)}k_2^{(1)}} & \ldots & b_{k_1^{(L-1)}k_2^{(L-1)}} & & & & 0 \\ 0 & & & & b_{k_1^{(0)}k_2^{(0)}} & b_{k_1^{(1)}k_2^{(1)}} & \ldots & b_{k_1^{(L-1)}k_2^{(L-1)}} \end{bmatrix}.$$

-continued $$\begin{bmatrix} p_{0,0}^{(2)} \cdot c_{0,0} & p_{0,1}^{(2)} \cdot c_{0,1} & \cdots & p_{0,M-1}^{(2)} \cdot c_{0,M-1} \\ p_{1,0}^{(2)} \cdot c_{1,0} & p_{1,1}^{(2)} \cdot c_{1,1} & \cdots & p_{1,M-1}^{(2)} \cdot c_{1,M-1} \\ \vdots & & & \vdots \\ p_{2L-1,0}^{(2)} \cdot c_{2L-1,0} & p_{2L-1,1}^{(2)} \cdot c_{2L-1,1} & \cdots & p_{2L-1,M-1}^{(2)} \cdot c_{2L-1,M-1} \end{bmatrix}.$$

$$\begin{bmatrix} q_0^{(1)} & 0 & \cdots & 0 \\ 0 & q_1^{(1)} & \ddots & \vdots \\ \vdots & \ddots & \ddots & 0 \\ 0 & \cdots & 0 & q_{2L-1}^{(1)} \end{bmatrix} \cdot \begin{bmatrix} f_{0,0} & f_{0,1} & \cdots & f_{0,N-1} \\ f_{1,0} & f_{1,1} & \cdots & f_{1,N-1} \\ \vdots & & & \vdots \\ f_{M-1,0} & f_{M-1,1} & \cdots & f_{M-1,N-1} \end{bmatrix}$$

Herein, $q_i^{(1)}$ represents a wideband amplitude coefficient, and $p_{i,j}^{(2)}$ represents a difference amplitude coefficient. 2L beams in $W_1$ include L different beams. Among the L different beams, a coefficient set corresponding to each beam is composed of two rows in $\tilde{W}_2$. For example, a coefficient set corresponding to a first beam $b_{k_1^{(0)},k_1^{(0)}}$ includes a wideband amplitude coefficient set $\{q_0^{(1)} q_1^{(1)} \ldots q_{M-1}^{(1)}\}$ and a difference amplitude coefficient set $\{p_{0,0}^{(2)} p_{0,1}^{(2)} \ldots p_{0,M-1}^{(2)}, p_{L,0}^{(2)} p_{L,1}^{(2)} \ldots p_{L,M-1}^{(2)}\}$, and a phase coefficient set $\{c_{0,0} c_{0,1} \ldots c_{0,M-1}, c_{L,0} c_{L,1} \ldots c_{L,M-1}\}$. A coefficient set corresponding to a second beam $b_{k_1^{(1)},k_1^{(1)}}$ includes a wideband amplitude coefficient set $\{q_0^{(1)} q_1^{(1)} \ldots q_{M-1}^{(1)}\}$, and a difference amplitude coefficient set $\{p_{1,0}^{(2)} p_{1,1}^{(2)} \ldots p_{1,M-1}^{(2)}, p_{L+1,0}^{(2)} p_{L+1,1}^{(2)} \ldots p_{L+1,M-1}^{(2)}\}$, and a phase coefficient set $\{c_{1,0} c_{1,1} \ldots c_{1,M-1}, c_{L+1,0} c_{L+1,1} \ldots c_{L+1,M-1}\}$, and so on.

It should be noted that if the 2L beams in $W_1$ differ with one another, the coefficient set corresponding to each beam is composed of one row in $\tilde{W}_2$. In M base vectors in $W_f$, the coefficient set corresponding to each base vector is composed of one column in $\tilde{W}_2$. For example, a coefficient set corresponding to a first base vector $[f_{0,0} f_{0,1} \ldots f_{1,N-1}]^H$ includes a difference amplitude coefficient set $\{p_{0,0}^{(2)} p_{1,0}^{(2)} \ldots p_{2L-1,0}^{(2)}\}$, a wideband amplitude coefficient $q_0^{(1)}$, and a phase coefficient set $\{c_{0,0} c_{1,0} \ldots c_{2L-1,0}\}$. A coefficient set corresponding to a second base vector $[f_{1,0} f_{1,1} \ldots f_{1,N-1}]^H$ includes a difference amplitude coefficient set $\{p_{0,1}^{(2)} p_{1,1}^{(2)} \ldots p_{2L-1,1}^{(2)}\}$, a wideband amplitude coefficient $q_1^{(1)}$, and a phase coefficient set $\{c_{0,1} c_{1,1} \ldots c_{2L-1,1}\}$, and so on.

The system appoints that the coefficients in the coefficient set corresponding to each base vector are restricted to limit a value of wideband amplitude coefficients in the set.

A base station indicates that a maximum difference amplitude value in the amplitude coefficient set of the coefficient set corresponding to each base vector of 4 base vectors in base vector group 2 and 4 base vectors in base vector group 3 is restricted to be $Q_{max}^{(WB)}$, which may be selected from wideband amplitude coefficient quantization values of the Type II codebook. High-level signaling indicates that amplitudes of the 8 base vectors are restricted to be $\{Q_{max1}^{(WB)} Q_{max2}^{(WB)} \ldots Q_{max8}^{(WB)}\}$. The terminal determines according to a channel estimation result that when a third base vector in $W_f$ is a second base vector in the 8 restricted base vectors, coefficients in $\tilde{W}_2$ are restricted to meet a relation:

$$q_2^{(1)} \leq Q_{max2}^{(WB)}.$$

The terminal calculates feedback coefficients of the Type II codebook according to the above restriction conditions and reports the feedback coefficients to the base station.

Figure 3:
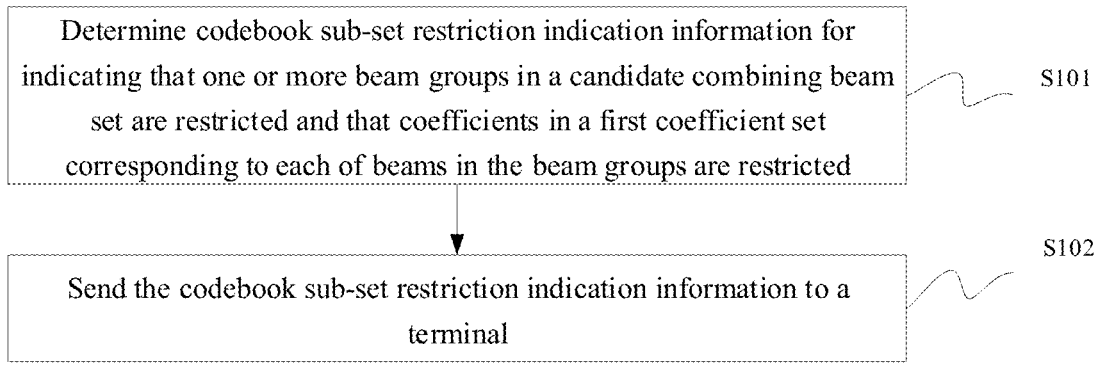
FIG. 3 is a schematic flowchart of a codebook restriction method provided by an embodiment of the disclosure.

To sum up, on a base station side, as shown in FIG. 3, an embodiment of the disclosure provides a codebook restriction method, including the following steps.

S101, codebook sub-set restriction indication information is determined for indicating that one or more beam groups in a candidate combining beam set are restricted and that coefficients in a first coefficient set corresponding to each of beams in the one or more beam groups are restricted.

S102, the codebook sub-set restriction indication information is sent to a terminal.

Through the method, the codebook sub-set restriction indication information is determined for indicating that one or more beam groups in the candidate combining beam set are restricted and that one or more coefficients in the first coefficient set corresponding to each beam in the beam groups is restricted, and the codebook sub-set restriction indication information is sent to the terminal, and be restricted means that one or more beam groups are controlled through signaling, and thus a coefficient value range or a function value range of coefficients corresponding to the beams in the beam groups are limited.

Accordingly, as the orientation of the final beam is determined by the candidate combining beam set and coefficients in the coefficient set, through control over the coefficients in the coefficient set, the beam direction may be adjusted to prevent the beams from pointing to some directions, and preventing the generation of a beam with an orientation bringing about interference and then preventing interference.

In one embodiment, the one or more beam groups in the candidate combining beam set are formed through one of the following manners:
  manner 1, beams mutually orthogonal with each other in the candidate combining beam set are in one beam group; and
  manner 2, beams adjacent to each other in the candidate combining beam set are in one beam group.

In one embodiment, a coefficient in the first coefficient set corresponding to each of the beams in the one or more beam groups is used for generating a weight of the beam on each sub-band.

In one embodiment, the coefficients in the first coefficient set are restricted for limiting the following:
  limiting a value of each amplitude coefficient among all the coefficients in the first coefficient set, or a value of a pre-defining first function of part of or all of the amplitude coefficients; or
  limiting a value of each phase coefficient among all the coefficients in the first coefficient set, or a value of a pre-defining second function of part of or all of the phase coefficients; or
  limiting a value of each of amplitude coefficients and a value of each of phase coefficients among all the coefficients in the first coefficient set, or a value of a pre-defining third function of part of or all of the amplitude coefficients and the phase coefficients.

In one embodiment, the pre-defining first function is a sum of all the amplitude coefficients, or a maximum value in all the amplitude coefficients, or a maximum value of wideband amplitude coefficients, or a maximum value in all difference amplitude coefficients, or a maximum value of the wideband amplitude coefficients and a maximum value in all the difference amplitude coefficients, or a maximum value of products of the wideband amplitude coefficients and the difference amplitude coefficients, or a maximum value of the wideband amplitude coefficients and a sum of all the difference amplitude coefficients, or a sum of products of the wideband amplitude coefficients and each of the difference amplitude coefficients; and the pre-defining second function is a sum of all the phase coefficients, or a maximum value of all the phase coefficients, or a minimum value of phase differences in all the phase coefficients.

In one embodiment, the codebook sub-set restriction indication information is further used for indicating that one or more base vector groups in a candidate base vector set are restricted.

In one embodiment, the base vector groups are formed through one of the following manners:

manner 1, base vectors mutually orthogonal with each other in the candidate base vector set are in one base vector group; and manner 2, base vectors adjacent to each other in the candidate base vector set are in one base vector group.

In one embodiment, the codebook sub-set restriction indication information is further used for indicating that coefficients in a second coefficient set corresponding to each of base vectors in the one or more restricted base vector groups are restricted.

In one embodiment, the coefficients in the second coefficient set corresponding to each of the base vectors are restricted for limiting the following:

limiting a value of each amplitude coefficient among all coefficients in the second coefficient set corresponding to each of the base vectors, or a value of a pre-defining fourth function of part of or all of the amplitude coefficients; or limiting a value of each phase coefficient among all the coefficients in the second coefficient set corresponding to each of the base vectors, or a value of a pre-defining fifth function of part of or all of the phase coefficients; or limiting a value of each of amplitude coefficients and a value of each of phase coefficients among all the coefficients in the second coefficient set corresponding to each of the base vectors, or a value of a pre-defining sixth function of part of or all of the amplitude coefficients and the phase coefficients.

In one embodiment, the pre-defining fourth function is a sum of all the amplitude coefficients, or a maximum value in all the amplitude coefficients, or a maximum value of wideband amplitude coefficients, or a maximum value in all difference amplitude coefficients, or a maximum value of the wideband amplitude coefficients and a maximum value in all the difference amplitude coefficients, or a maximum value of products of the wideband amplitude coefficients and the difference amplitude coefficients, or a maximum value of the wideband amplitude coefficients and a sum of all the difference amplitude coefficients, or a sum of products of the wideband amplitude coefficients and each of the difference amplitude coefficients; and the pre-defining fifth function is a sum of all the phase coefficients, or a maximum value in all the phase coefficients, or a minimum value of phase differences in all the phase coefficients.

In one embodiment, the codebook sub-set restriction indication information is further used for indicating that all base vectors in the one or more restricted base vector groups may not be used for codebook configuration and feedback.

In one embodiment, the codebook sub-set restriction indication information is further used for restricting a value of a number of the base vectors corresponding to one or more beams.

In one embodiment, the codebook sub-set restriction indication information is further used for restricting a value of a number of coefficients which are zero in all codebook coefficients.

Figure 4:
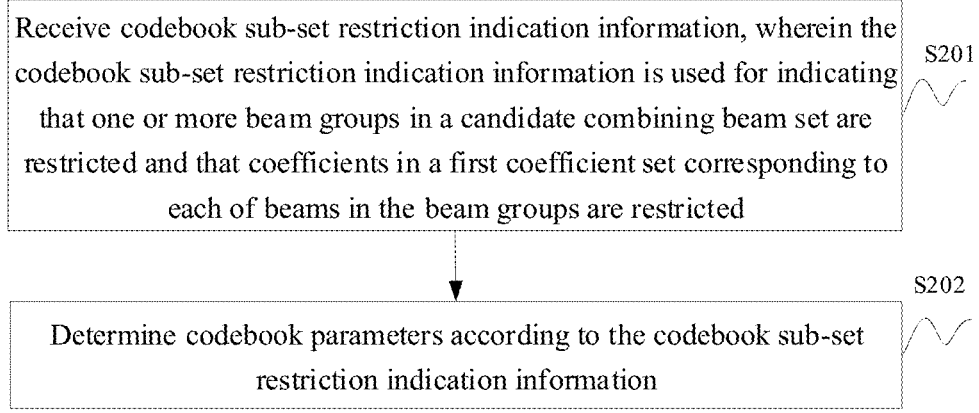
FIG. 4 is a schematic flowchart of a codebook parameter determination method provided by an embodiment of the disclosure.

Correspondingly, on a terminal side, as shown in FIG. 4, an embodiment of the disclosure provides a codebook parameter determination method, including the following steps.

S201, codebook sub-set restriction indication information is received, and the codebook sub-set restriction indication information is used for indicating that one or more beam groups in a candidate combining beam set are restricted, and that coefficients in a first coefficient set corresponding to each of beams in the one or more beam groups are restricted.

S202, codebook parameters are determined according to the codebook sub-set restriction indication information.

In one embodiment, the codebook sub-set restriction indication information is further used for indicating that one or more base vector groups in a candidate base vector set are restricted.

In one embodiment, the codebook sub-set restriction indication information is further used for indicating that coefficients in a second coefficient set corresponding to each of base vectors in the one or more restricted base vector groups are restricted.

In one embodiment, the codebook sub-set restriction indication information is further used for indicating that all base vectors in the one or more restricted base vector groups may not be used for codebook configuration and feedback.

In one embodiment, the codebook sub-set restriction indication information is further used for restricting a value of a number of the base vectors corresponding to one or more beams.

In one embodiment, the codebook sub-set restriction indication information is further used for restricting a value of a number of coefficients which are zero in all codebook coefficients.

In one embodiment, the method further includes: sending the codebook parameters to a base station.

Figure 5:
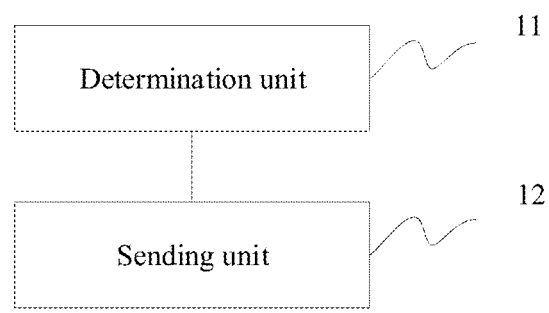
FIG. 5 is a schematic structural diagram of a codebook restriction apparatus provided by an embodiment of the disclosure.

On a network side, as shown in FIG. 5, an embodiment of the disclosure provides a codebook restriction apparatus, including:

a determination device 11, configured to determine the codebook sub-set restriction indication information used for indicating that one or more beam groups in a candidate combining beam set are restricted, and that coefficients in a first coefficient set corresponding to each of beams in the one or more beam groups are restricted; and a sending device 12, configured to send the codebook sub-set restriction indication information to a terminal.

Figure 6:
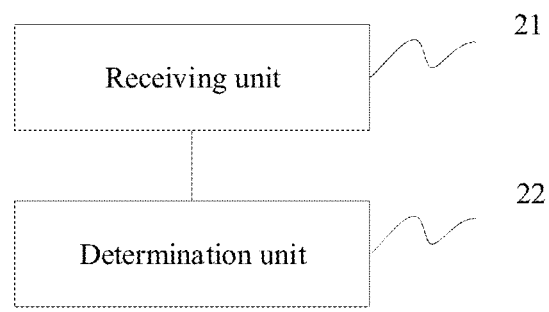
FIG. 6 is a schematic structural diagram of a codebook parameter determination apparatus provided by an embodiment of the disclosure.

On a terminal side, as shown in FIG. 6, an embodiment of the disclosure provides a codebook parameter determination apparatus, including:

a receiving device 21, configured to receive codebook sub-set restriction indication information, and the codebook sub-set restriction indication information is used for indicating that one or more beam groups in a candidate combining beam set are restricted, and that coefficients in a first coefficient set corresponding to each of beams in the one or more beam groups are restricted; and a determination device 22, configured to determine codebook parameters according to the codebook sub-set restriction indication information.

It should be noted that division of the units in the embodiments of the disclosure is exemplary and is only a logical function division, and other division manners are allowed during actual implementations. Besides, all the function units in the various embodiments of the disclosure may be integrated into one processing unit, or all the units may exit physically independently, or two or more units may be integrated into one unit. The integrated units may be achieved in a manner of hardware or in a manner of software function units.

If the integrated units are achieved in a manner of software function units and are sold or used as an independent product, the integrated units may be stored in a computer readable storage medium. Based on this understanding, embodiments of the disclosure may be essentially embodied in a manner of a software product, or part of the embodiments making contributions that may be embodied in a manner of a software product, or part of or all of the embodiments may be embodied in a manner of a software product. The computer software product is stored in a storage medium, including instructions for making a computer device (may be a personal computer, a server, a network device, etc.) or a processor execute all or part of the steps of the methods of the various embodiments of the disclosure. The mentioned storage medium includes: a USB flash disk, a mobile hard disk drive, a Read-only Memory (ROM), a Random Access Memory (RAM), a diskette, or a compact disc and other various media to store program codes.

Figure 7:
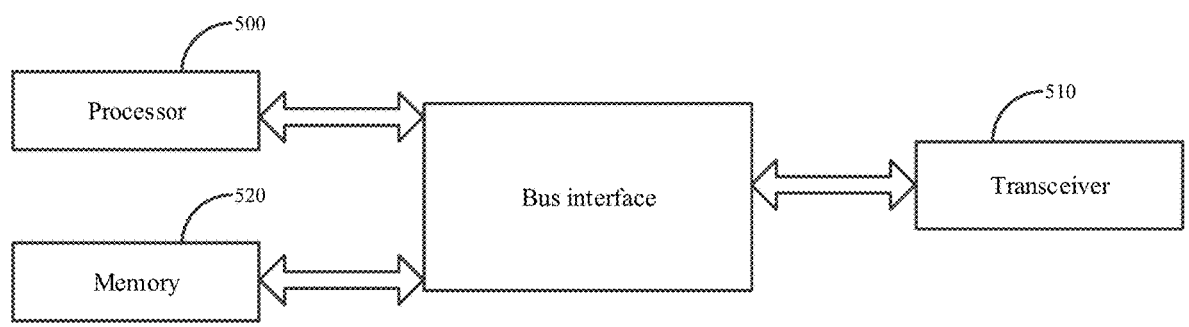
FIG. 7 is a schematic structural diagram of another codebook restriction apparatus provided by an embodiment of the disclosure.

On a network side, e.g., a base station side, as shown in FIG. 7, an embodiment of the disclosure provides another codebook restriction apparatus, including:

a memory 520, configured to store program instructions; and a processor 500, configured to call the program instructions stored in the memory to:

determine codebook sub-set restriction indication information for indicating that one or more beam groups in a candidate combining beam set are restricted and that coefficients in a first coefficient set corresponding to each of beams in the beam groups are restricted; and send the codebook sub-set restriction indication information to a terminal through a transceiver 510.

In one embodiment, the one or more beam groups in the candidate combining beam set are formed through one of the following manners:

manner 1, beams mutually orthogonal with each other in the candidate combining beam set are in one beam group; and manner 2, beams adjacent to each other in the candidate combining beam set are in one beam group.

In one embodiment, a coefficient in the first coefficient set corresponding to each of the beams in the one or more beam groups is used for generating a weight of the beam on each sub-band.

In one embodiment, the coefficients in the first coefficient set are restricted for limiting the following:

limiting a value of each amplitude coefficient among all coefficients in the first coefficient set, or a value of a pre-defining first function of part of or all of the amplitude coefficients; or limiting a value of each phase coefficient among all the coefficients in the first coefficient set, or a value of a pre-defining second function of part of or all of the phase coefficients; or limiting a value of each of amplitude coefficients and a value of each of phase coefficients among all the coefficients in the first coefficient set, or a value of a pre-defining third function of part of or all of the amplitude coefficients and the phase coefficients.

In one embodiment, the pre-defining first function is a sum of all the amplitude coefficients, or a maximum value in all the amplitude coefficients, or a maximum value of wideband amplitude coefficients, or a maximum value in all difference amplitude coefficients, or a maximum value of the wideband amplitude coefficients and a maximum value in all the difference amplitude coefficients, or a maximum value of products of the wideband amplitude coefficients and the difference amplitude coefficients, or a maximum value of the wideband amplitude coefficients and a sum of all the difference amplitude coefficients, or a sum of products of the wideband amplitude coefficients and each of the difference amplitude coefficients; and the pre-defining second function is a sum of all the phase coefficients, or a maximum value in all the phase coefficients, or a minimum value of phase differences in all the phase coefficients.

In one embodiment, the codebook sub-set restriction indication information is further used for indicating that one or more base vector groups in a candidate base vector set are restricted.

In one embodiment, the base vector groups are formed through one of the following manners:

manner 1, base vectors mutually orthogonal with each other in the candidate base vector set are in one base vector group; and manner 2, base vectors adjacent to each other in the candidate base vector set are in one base vector group.

In one embodiment, the codebook sub-set restriction indication information is further used for indicating that coefficients in a second coefficient set corresponding to each of the base vectors in one or more restricted base vector groups are restricted.

In one embodiment, the coefficients in the second coefficient set corresponding to each of the base vectors are restricted for limiting the following:

limiting a value of each of the amplitude coefficients in all the coefficients in the second coefficient set corresponding to each of the base vectors, or a value of a pre-defining fourth function of part of or all of the amplitude coefficients; or limiting a value of each of the phase coefficients in all the coefficients in the second coefficient set corresponding to each of the base vectors, or a value of a pre-defining fifth function of part of or all of the phase coefficients; or limiting a value of each of amplitude coefficients and a value of each of phase coefficients in all the coefficients in the second coefficient set corresponding to each of the base vectors, or a value of a pre-defining sixth function of part of or all of the amplitude coefficients and the phase coefficients.

In one embodiment, the pre-defining fourth function is a sum of all the amplitude coefficients, or a maximum value in all the amplitude coefficients, or a maximum value of wideband amplitude coefficients, or a maximum value in all difference amplitude coefficients, or a maximum value of the wideband amplitude coefficients and a maximum value in all the difference amplitude coefficients, or a maximum value of products of the wideband amplitude coefficients and the difference amplitude coefficients, or a maximum value of the wideband amplitude coefficients and a sum of all the difference amplitude coefficients, or a sum of products of the wideband amplitude coefficients and each of the difference amplitude coefficients; and the pre-defining fifth function is a sum of all the phase coefficients, or a maximum value in all the phase coefficients, or a minimum value of phase differences in all the phase coefficients.

In one embodiment, the codebook sub-set restriction indication information is further used for indicating that all the base vectors in one or more restricted base vector groups may not be used for codebook configuration and feedback.

In one embodiment, the codebook sub-set restriction indication information is further used for restricting a value of a number of the base vectors corresponding to one or more beams.

In one embodiment, the codebook sub-set restriction indication information is further used for restricting a value of a number of coefficients which are zero in all codebook coefficients.

The transceiver 510 is configured to receive and send data under control of the processor 500.

In FIG. 7, a bus architecture may include any number of interconnecting buses and bridges, specifically linking various circuits of one or more processors represented by the processor 500 and the memories represented by the memory 520. The bus architecture may further link other various circuits like peripheral devices, a voltage stabilizer, a power management circuit, etc., which are known to those in the art and will not be further described herein. A bus interface provides an interface. The transceiver 510 may be elements, namely including a transmitter and a receiver, providing units for communicating with other various devices on a transmission medium. The processor 500 is in charge of managing the bus architecture and general processing. The memory 520 may store data used during executing operation of the processor 500.

The processor 500 may be a central processing unit (CPU), an Application Specific Integrated Circuit (ASIC), a Field-Programmable Gate Array (FPGA), or a Complex Programmable Logic Device (CPLD).

Figure 8:
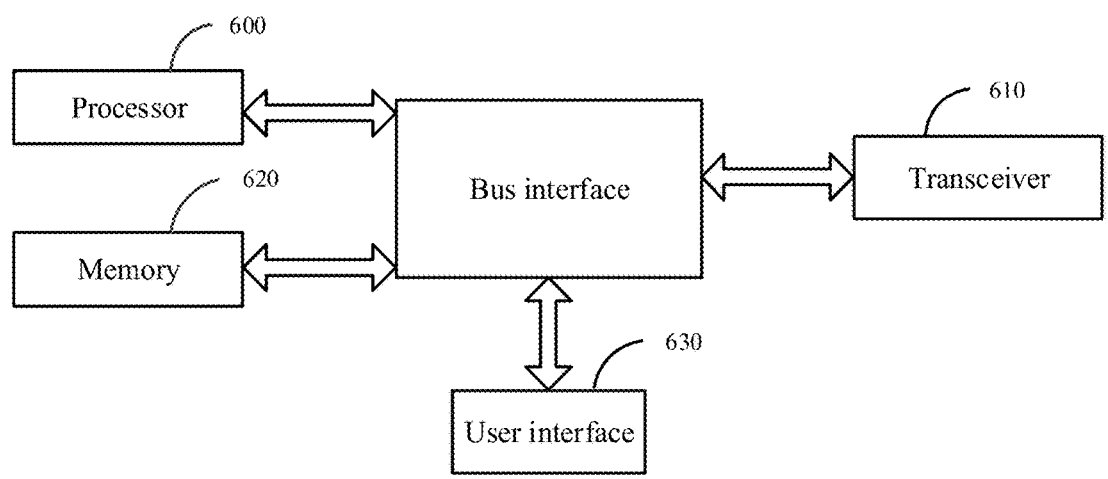
FIG. 8 is a schematic structural diagram of another codebook parameter determination apparatus provided by an embodiment of the disclosure.

On a terminal side, as shown in FIG. 8, an embodiment of the disclosure provides a codebook parameter determination apparatus, including:

a memory 620, configured to store program instructions; and a processor 600, configured to call the program instructions stored in the memory to:

receive codebook sub-set restriction indication information, and the codebook sub-set restriction indication information is used for indicating that one or more beam groups in a candidate combining beam set are restricted and that coefficients in a first coefficient set corresponding to each of beams in the one or more beam groups are restricted; and determine codebook parameters according to the codebook sub-set restriction indication information.

In one embodiment, the codebook sub-set restriction indication information is further used for indicating that one or more base vector groups in a candidate base vector set are restricted.

In one embodiment, the codebook sub-set restriction indication information is further used for indicating that coefficients in a second coefficient set corresponding to each of base vectors in the one or more restricted base vector groups are restricted.

In one embodiment, the codebook sub-set restriction indication information is further used for indicating that all the base vectors in one or more restricted base vector groups may not be used for codebook configuration and feedback.

In one embodiment, the codebook sub-set restriction indication information is further used for restricting a value of a number of the base vectors corresponding to one or more beams.

In one embodiment, the codebook sub-set restriction indication information is further used for restricting a value of a number of coefficients which are zero in all codebook coefficients.

In one embodiment, the processor 600 is further used for calling the program instructions stored in the memory to:

send the codebook parameters to a base station through a transceiver 610.

The transceiver 610 is configured to receive and send data under control of the processor 600.

In FIG. 8, a bus architecture may include any number of interconnecting buses and bridges, specifically linking various circuits of one or more processors represented by the processor 600 and the memories represented by the memory 620. The bus architecture may further link other various circuits like peripheral devices, a voltage stabilizer, a power management circuit, etc., which are known to those in the art and will not be further described herein. A bus interface provides an interface. The transceiver 610 may be elements, namely including a transmitter and a receiver, providing units for communicating with other various devices on a transmission medium. As for different user equipment, a user interface 630 may be an interface to be internally or externally connected with needed devices including but is not limited to a keypad, a display, a loudspeaker, a microphone, a joystick, etc.

The processor 600 is in charge of managing the bus architecture and general processing, and the memory 620 may store data used during executing operation of the processor 600.

In one embodiment, the processor 600 may be a central processing unit (CPU), an Application Specific Integrated Circuit (ASIC), a Field-Programmable Gate Array (FPGA), or a Complex Programmable Logic Device (CPLD).

The apparatus provided by the embodiment of the disclosure may be a computing device which may be, a desk-top computer, a portable computer, a smart phone, a tablet PC, a Personal Digital Assistant (PDA), etc. The computing device may include the central processing unit (CPU), a memory, an input/output device, etc. The input device may include a keyboard, a mouse, a touch screen, etc. The output device may include a display device, e.g., a Liquid Crystal Display (LCD), a Cathode Ray Tube (CRT), etc.

The memory may include a read-only memory (ROM) and a random access memory (RAM) and provides the program instructions and data stored herein for the processor. In the embodiments of the disclosure, the memory may be used for storing program of any one of the methods provided by the embodiments of the disclosure.

The processor calls the program instructions stored in the memory and is used for executing any one of the methods provided by the embodiments of the disclosure according to the obtained program instructions.

An embodiment of the disclosure provides a computer storage medium used for storing computer program instructions used by the apparatuses provided by the embodiments of the disclosure, which include program for executing any one of the methods provided by the embodiments of the disclosure.

The computer storage medium may be any applicable medium or data storage devices which may be accessed by a computer, including but is not limited to a magnetic memory (e.g., a floppy disk, a hard disk, a magnetic tape, a magnetooptical disk (MO), etc.), an optical memory (e.g., CD, DVD, BD, HVD, etc.), and a semiconductor memory (e.g., ROM, EPROM, EEPROM, a NAND FLASH, a solid state drive (SSD)), etc.

The methods provided by the embodiments of the disclosure may be applied to terminal devices, or network devices.

The terminal devices may be also called User Equipment (UE for short), a mobile station (MS for short), a mobile terminal, etc. In one embodiment, the terminal may communicate with one or more core networks through a Radio Access Network (RAN), for example, the terminal may be a mobile phone (or called a "cell" phone), or a mobile computer, etc. For example, the terminal may further be a portable or pocket or hand-held or computer built-in or vehicle-mounted mobile device.

The network devices may be a base station (e.g., an access point), referring to devices for communicating with a wireless terminal on an air interface in an access network through one or more sectors. The base station may be used for interconverting a received air frame and an IP group, serving as router between the wireless terminal and the rest part of the access network. The rest part of the access network may include an internet protocol (IP) network. The base station may further coordinate attribute management of the air interface. For example, the base station may be a Base Transceiver Station (BTS) in GSM or CDMA, or a NodeB in WCDMA, or an evolutional Node B (NodeB or eNB or e-NodeB) in LTE, or a gNB in a 5G system, etc., which is not limited here.

The flows of the methods may be achieved through a software program which may be stored in the storage medium, and when the stored software program is called, the steps of the methods are executed.

To sum up, in the embodiments of the disclosure, the coefficients in the coefficient set corresponding to each beam and/or each base vector or the functions of the coefficients are restricted, and preventing the generation of beams with some orientations and then preventing interference.

Embodiments of the present disclosure may be provided as the methods, the system, or the computer program product. Thus, the present disclosure may adopt manners of a complete hardware embodiment, a complete software embodiment, or a software and hardware combined embodiment. Besides, the present disclosure may adopt a manner of a computer program product implemented on one or more computer applicable storage media (including but is not limited to a disk memory, CD-ROM, an optical memory, etc.) including computer applicable program codes.

The present disclosure is described in reference to the flowchart and/or a block diagram of the methods, the devices (system) and the computer program product according to the embodiments of the present disclosure. It should be understood that each flow and/or block in the flowchart and/or the block diagram, and combination of flows and/or blocks in the flowchart and/or block diagram may be implemented through the computer program instructions. These computer program instructions may be provided for a processor of a general-purpose computer, a special-purpose computer, an embedded processor or other programmable data processing devices to generate a machine, so that an apparatus for achieving appointed functions in one or more flows in the flowchart and/or one or more blocks in the block diagram is generated through the instructions executed by the processor of the computer or other programmable data processing devices.

These computer program instructions may also be stored in a computer readable memory to guide the computer or other programmable data processing devices to work in a specified manner, so that the instructions stored in the computer readable memory may generate a product including an instruction apparatus, and the instruction apparatus achieves the appointed functions in one or more flows in the flowchart and/or one or more blocks in the block diagram.

These computer program instructions may also be loaded onto the computer or other programmable data processing devices, so that a series of operation steps may be executed on the computer or other programmable devices to generate processing achieved by the computer, then the instructions executed on the computer or other programmable devices provide steps for achieving the appointed functions in one or more flows in the flowchart and/or one or more blocks in the block diagram.

Although the embodiments of the present disclosures are described, those skilled in the art may make other changes and modifications for these embodiments. Therefore, the appended claims intend to be constructed as including the embodiments and all changes and modifications which fall in the scope of the present disclosure.

What is claimed is:

1. A codebook restriction method, comprising:
    determining codebook sub-set restriction indication information for indicating that one or more beam groups in a candidate combining beam set are restricted and that coefficients in a first coefficient set corresponding to each of beams in the one or more beam groups are restricted; and
    sending the codebook sub-set restriction indication information to a terminal;
    wherein the coefficients in the first coefficient set are restricted for limiting a value of each amplitude coefficient among all the coefficients in the first coefficient set, or a value of a pre-defining first function of part of or all of the amplitude coefficients.

2. The method according to claim 1, wherein the one or more beam groups in the candidate combining beam set are formed through one of the following manners:
    manner 1, a plurality of beams mutually orthogonal with each other in the candidate combining beam set are in one beam group; and
    manner 2, a plurality of beams adjacent to each other in the candidate combining beam set are in one beam group.

3. The method according to claim 1, wherein a coefficient in the first coefficient set corresponding to each of the beams in the one or more beam groups is used for generating a weight of the beam on each sub-band.

4. The method according to claim 1, wherein
    the pre-defining first function is a sum of all the amplitude coefficients, or a maximum value in all the amplitude coefficients, or a maximum value of wideband amplitude coefficients, or a maximum value in all difference amplitude coefficients, or a maximum value of the wideband amplitude coefficients and a maximum value in all the difference amplitude coefficients, or a maximum value of products of the wideband amplitude coefficients and the difference amplitude coefficients, or a maximum value of the wideband amplitude coefficients and a sum of all the difference amplitude coefficients, or a sum of products of the wideband amplitude coefficients and each of the difference amplitude coefficients.

5. The method according to claim 1, wherein the codebook sub-set restriction indication information is further used for indicating that one or more base vector groups in a candidate base vector set are restricted; and/or
wherein the codebook sub-set restriction indication information is further used for indicating that one or more base vector groups in a candidate base vector set are restricted, and indicating that coefficients in a second coefficient set corresponding to each of base vectors in the one or more restricted base vector groups are restricted.

6. The method according to claim 5, wherein the base vector groups are formed through one of the following manners:
manner 1, a plurality of base vectors mutually orthogonal with each other in the candidate base vector set are in one base vector group; and
manner 2, a plurality of base vectors adjacent to each other in the candidate base vector set are in one base vector group.

7. The method according to claim 5, wherein the coefficients in the second coefficient set corresponding to each of the base vectors are restricted for limiting the following:
limiting a value of each amplitude coefficient among all coefficients in the second coefficient set corresponding to each of the base vectors, or a value of a pre-defining fourth function of part of or all of the amplitude coefficients; or
limiting a value of each phase coefficient among all the coefficients in the second coefficient set corresponding to each of the base vectors, or a value of a pre-defining fifth function of part of or all of the phase coefficients; or
limiting a value of each of amplitude coefficients and a value of each of phase coefficients among all the coefficients in the second coefficient set corresponding to each of the base vectors, or a value of a pre-defining sixth function of part of or all of the amplitude coefficients and the phase coefficients;
wherein the pre-defining fourth function is a sum of all the amplitude coefficients, or a maximum value in all the amplitude coefficients, or a maximum value of wideband amplitude coefficients, or a maximum value in all difference amplitude coefficients, or a maximum value of the wideband amplitude coefficients and a maximum value in all the difference amplitude coefficients, or a maximum value of products of the wideband amplitude coefficients and the difference amplitude coefficients, or a maximum value of the wideband amplitude coefficients and a sum of all the difference amplitude coefficients, or a sum of products of the wideband amplitude coefficients and each of the difference amplitude coefficients; and the pre-defining fifth function is a sum of all the phase coefficients, or a maximum value in all the phase coefficients, or a minimum value of phase differences in all the phase coefficients.

8. The method according to claim 5, wherein the codebook sub-set restriction indication information is further used for indicating that all base vectors in the one or more restricted base vector groups is not used for codebook configuration and feedback; or
the codebook sub-set restriction indication information is further used for restricting a value of a number of base vectors corresponding to one or more beams; or
the codebook sub-set restriction indication information is further used for restricting a value of a number of coefficients which are zero in all codebook coefficients.

9. A codebook restriction apparatus, comprising:
a memory, configured to store program instructions; and
a processor, configured to call the program instructions stored in the memory to perform the method according to claim 1.

10. A codebook parameter determination method, comprising:
receiving codebook sub-set restriction indication information, wherein the codebook sub-set restriction indication information is used for indicating that one or more beam groups in a candidate combining beam set are restricted, and that coefficients in a first coefficient set corresponding to each of beams in the one or more beam groups are restricted; and
determining codebook parameters according to the codebook sub-set restriction indication information;
wherein the coefficients in the first coefficient set are restricted for limiting a value of each amplitude coefficient among all the coefficients in the first coefficient set, or a value of a pre-defining first function of part of or all of the amplitude coefficients.

11. The method according to claim 10, wherein the codebook sub-set restriction indication information is further used for indicating that one or more base vector groups in a candidate base vector set are restricted; or
the codebook sub-set restriction indication information is further used for indicating that coefficients in a second coefficient set corresponding to each of base vectors in the one or more restricted base vector groups are restricted; or
the codebook sub-set restriction indication information is further used for indicating that all base vectors in the one or more restricted base vector groups is not used for codebook configuration and feedback.

12. The method according to claim 10, wherein the codebook sub-set restriction indication information is further used for restricting a value of a number of base vectors corresponding to one or more beams; or
wherein the codebook sub-set restriction indication information is further used for restricting a value of a number of coefficients which are zero in all codebook coefficients.

13. The method according to claim 10, wherein
the pre-defining first function is a sum of all the amplitude coefficients, or a maximum value in all the amplitude coefficients, or a maximum value of wideband amplitude coefficients, or a maximum value in all difference amplitude coefficients, or a maximum value of the wideband amplitude coefficients and a maximum value in all the difference amplitude coefficients, or a maximum value of products of the wideband amplitude coefficients and the difference amplitude coefficients, or a maximum value of the wideband amplitude coefficients and a sum of all the difference amplitude coefficients, or a sum of products of the wideband amplitude coefficients and each of the difference amplitude coefficients.

14. A codebook parameter determination apparatus, comprising:
a memory, configured to store program instructions; and
a processor, configured to call the program instructions stored in the memory to:
receive codebook sub-set restriction indication information, wherein the codebook sub-set restriction indication information is used for indicating that one or more beam groups in a candidate combining beam set are restricted, and that coefficients in a first coefficient set corresponding to each of beams in the one or more beam groups are restricted; and
determine codebook parameters according to the codebook sub-set restriction indication information;
wherein the coefficients in the first coefficient set are restricted for limiting a value of each amplitude coefficient among all the coefficients in the first coefficient set, or a value of a pre-defining first function of part of or all of the amplitude coefficients.

15. The apparatus according to claim 14, wherein the codebook sub-set restriction indication information is further used for indicating that one or more base vector groups in a candidate base vector set are restricted; or
the codebook sub-set restriction indication information is further used for indicating that coefficients in a second coefficient set corresponding to each of base vectors in the one or more restricted base vector groups are restricted; or
the codebook sub-set restriction indication information is further used for indicating that all base vectors in the one or more restricted base vector groups is not used for codebook configuration and feedback.

16. The apparatus according to claim 14, wherein the codebook sub-set restriction indication information is further used for restricting a value of a number of base vectors corresponding to one or more beams; or
the codebook sub-set restriction indication information is further used for restricting a value of a number of coefficients which are zero in all codebook coefficients.

17. The apparatus according to claim 14, wherein the pre-defining first function is a sum of all the amplitude coefficients, or a maximum value in all the amplitude coefficients, or a maximum value of wideband amplitude coefficients, or a maximum value in all difference amplitude coefficients, or a maximum value of the wideband amplitude coefficients and a maximum value in all the difference amplitude coefficients, or a maximum value of products of the wideband amplitude coefficients and the difference amplitude coefficients, or a maximum value of the wideband amplitude coefficients and a sum of all the difference amplitude coefficients, or a sum of products of the wideband amplitude coefficients and each of the difference amplitude coefficients.

* * * * *